March 7, 1939.　　　　E. O. SCHWEITZER, JR　　　2,149,634
TRANSFORMER FAULT INDICATING MEANS
Filed Sept. 10, 1936　　　　3 Sheets—Sheet 1
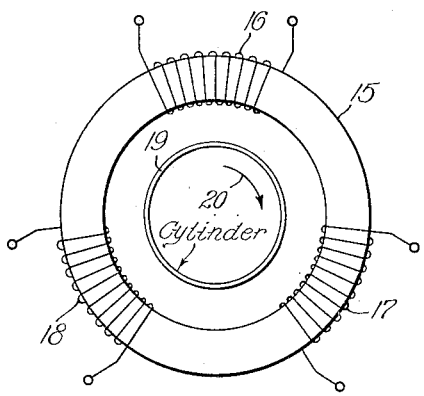
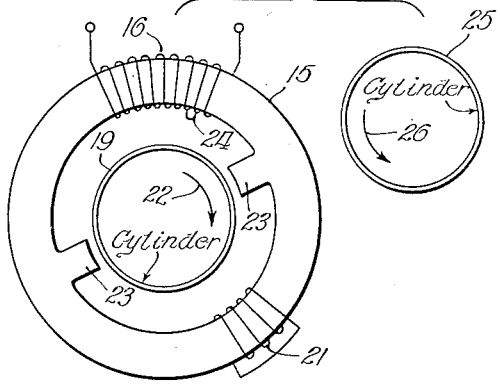
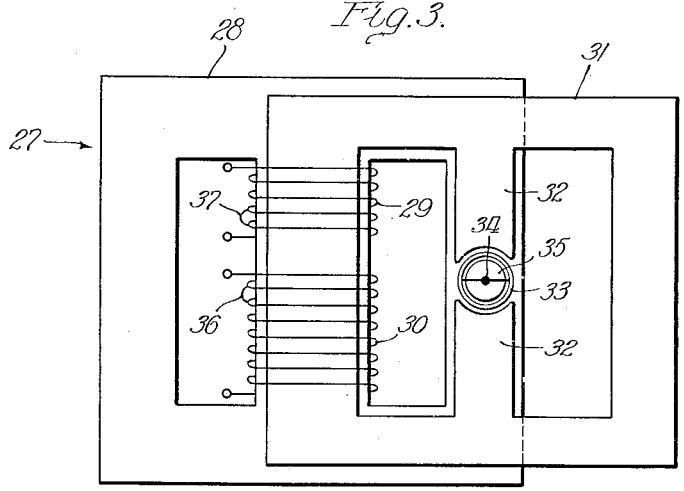
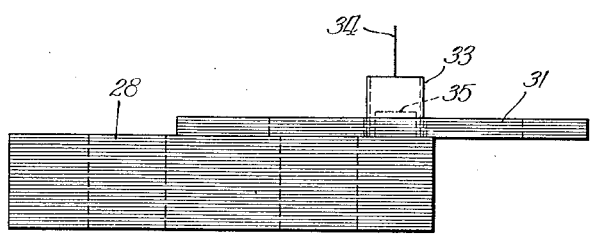
Inventor:
Edmund O. Schweitzer, Jr.

March 7, 1939.  E. O. SCHWEITZER, JR  2,149,634
TRANSFORMER FAULT INDICATING MEANS
Filed Sept. 10, 1936   3 Sheets-Sheet 2
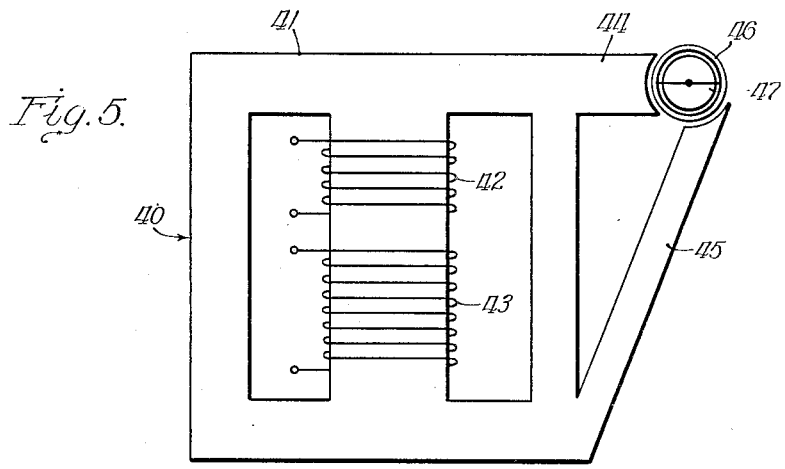
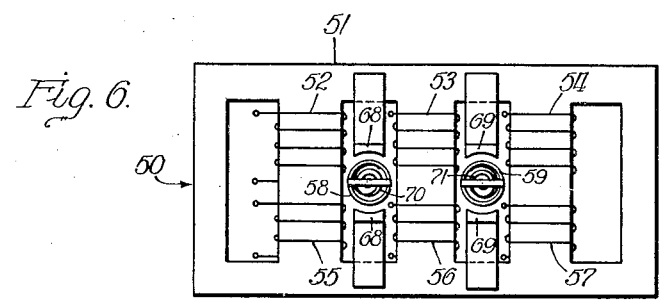
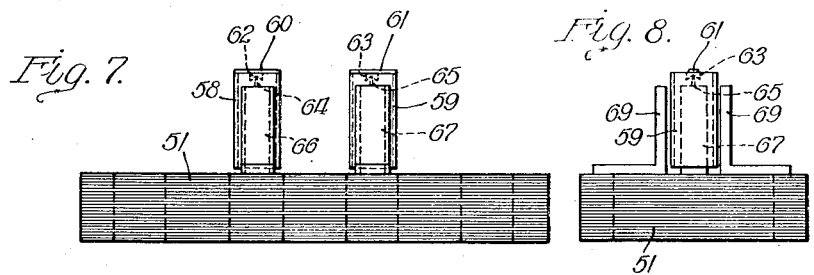
Inventor:
Edmund O. Schweitzer, Jr.

March 7, 1939.  E. O. SCHWEITZER, JR  2,149,634
TRANSFORMER FAULT INDICATING MEANS
Filed Sept. 10, 1936    3 Sheets-Sheet 3
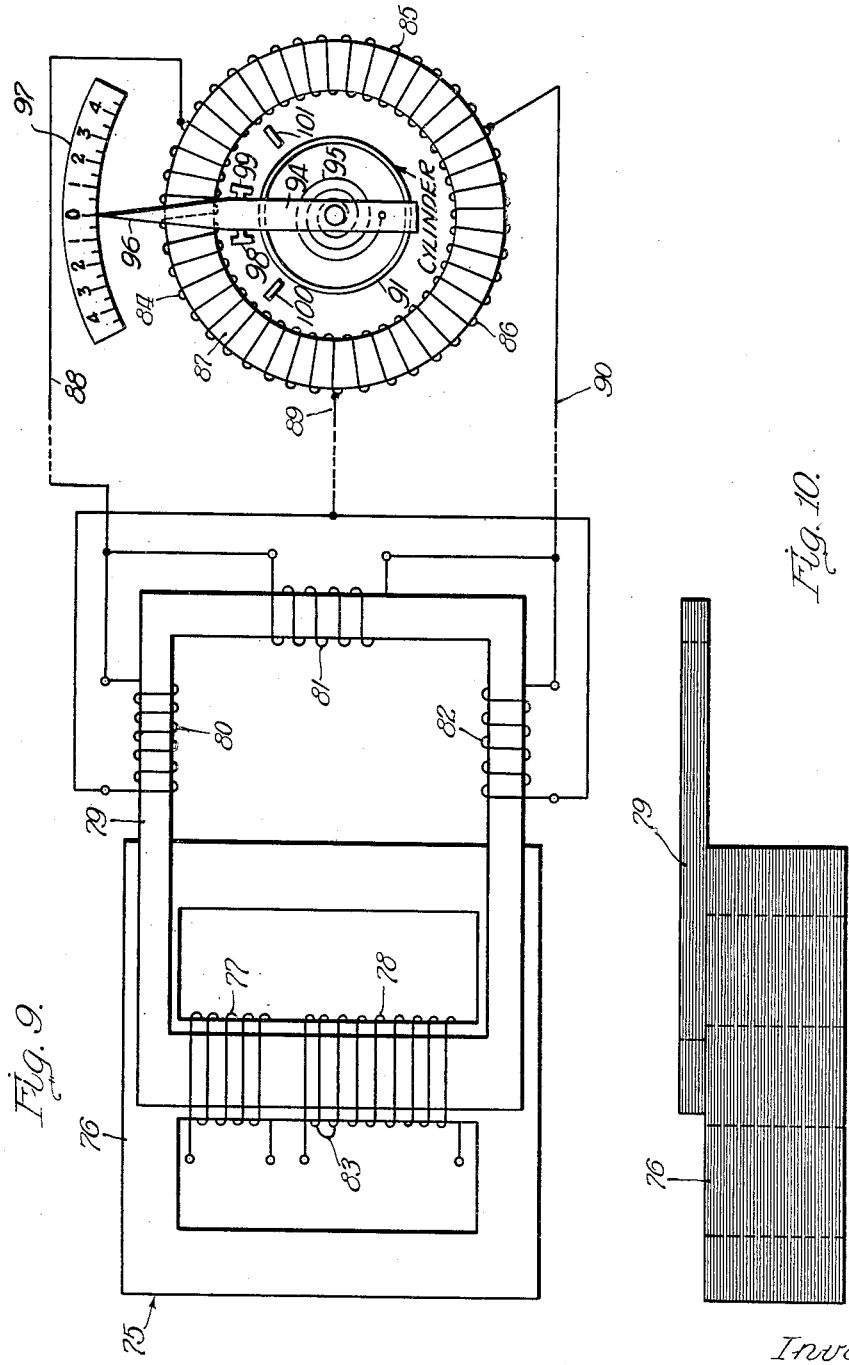
Inventor:
Edmund O. Schweitzer, Jr.

Patented Mar. 7, 1939

2,149,634

UNITED STATES PATENT OFFICE 2,149,634

TRANSFORMER FAULT INDICATING MEANS

Edmund O. Schweitzer, Jr., Northbrook, Ill.

Application September 10, 1936, Serial No. 100,162

15 Claims. (Cl. 177—311)

My invention relates, generally, to electrical indicating and control apparatus and it has particular relation to apparatus for indicating the presence of a fault in a winding of an inductive device, such as a transformer, and for deenergizing it as a result of the occurrence of the fault.

In the operation of inductive devices, such as transformers, it is desirable to provide an indication of the occurrence of a fault in one or more of its windings immediately upon the occurrence thereof. Ordinarily this fault will be in the nature of one or more short circuited turns of one or more of the windings of the transformer, or a failure of insulation between the winding and ground. As soon as such a fault occurs, the transformer should immediately be disconnected from its energizing source in order to reduce to a minimum the possible damage which may result. If the transformer is not immediately deenergized, the winding in which the fault has occurred may be injured beyond repair and, in some cases, damage may be extended to adjacent windings.

It will be understood that, on the occurrence of a short-circuited turn, a current flow takes place therein which is considerably in excess of the normal current flow through the turn under normal operating conditions. This current flow is caused by the transformer action between the turn and the remaining turns of the winding which may be connected for energization to an alternating current source, or by transformer action from an independent winding which may be connected to the alternating current source. In some instances, sufficient heat may be developed because of the flow of current in the short circuited turn to ignite the oil in which the transformer is ordinarily immersed, resulting in an explosion which not only injures the transformer itself but also may cause damage to adjacent apparatus and injury to persons who may be in the vicinity.

In the prior art, attempts have been made to provide an indication of the occurrence of a fault in one or more of the windings of a transformer. In general, this apparatus falls into three classes; one class is dependent for operation upon the temperature of the oil in which the transformer is immersed, or upon the temperature which is indicated from one or more hot-spot indicating devices in the form of thermocouples which are distributed at various points throughout the transformer; the second class depends for its operation upon the change in flow of current to the transformer as caused by the short-circuited turn or turns; the third class depends for its operation on pressure changes within the transformer. Indicating apparatus dependent upon the change in oil temperature is tardy in operation for the reason that considerable abnormal heat, which may be destructive, must be developed in order to raise the temperature of the oil above the normal operating temperature. The hot spot indicator is effective only in connection with the particular locations where it is applied, and the immediate vicinity thereof. The operation of fuses, over-current relays, or differential relays to indicate the presence of a fault is uncertain, for the reason that these devices must be designed to take care of temporary overloads which may be caused by momentary overloading of the transformer and which are not caused by the occurrence of a fault.

It will be apparent that the devices of the prior art which have been employed to indicate the presence of a fault in the windings of a transformer are not satisfactory, particularly for the reason that the fault must be developed to a considerable extent before any action takes place indicating its presence. That is, a considerable change must take place in the temperature of the oil or of the transformer windings beyond that which normally takes place under operating conditions, or the current flow must be increased to an abnormal extent to provide an indication of the presence of a fault within the windings that is responsible for the increase in temperature of current flow. As a consequence, the winding of windings of the transformer may be injured beyond repair or other damage may take place because the fault was not discovered as soon as it took place and appropriate steps were not taken to disconnect the transformer from its source of energization.

Therefore, the object of my invention, generally stated, is to provide apparatus for indicating the presence of a fault in any of the windings of a transformer or like inductive device which shall be simple, efficient, accurate and instantaneous in operation, and which may be readily and economically manufactured and installed.

An important object of my invention is to provide an indication of the presence of a fault in any of the windings of an inductive device, such as a transformer, instantly upon the occurrence thereof.

Another important object of my invention is to provide for deenergizing a transformer instantly upon the occurrence of a fault in any of its windings.

Another object of my invention is to provide for utilizing the change in the leakage field generated by the windings of a transformer on the occurrence of a fault therein for indicating the presence of the fault.

Still another object of my invention is to provide for utilizing the shifting field generated by the phase displaced currents resulting from the short circuiting of one or more turns of a winding to cause eddy currents to flow in a movable conductor for indicating by movement thereof the presence of the short circuited turn or turns.

Other objects of my invention will, in part, be obvious and in part appear hereinafter.

My invention, accordingly, is disclosed in the embodiments hereof shown in the accompanying drawings and it comprises the features of construction, combination of elements and arrangement of parts which will be exemplified in the constructions hereinafter set forth, and the scope of the application of which will be indicated in the appended claims.

For a more complete understanding of the nature and scope of my invention, reference may be had to the following detailed description, taken in conjunction with the accompanying drawings, in which:

Figures 1 and 2 illustrate, diagrammatically, the fundamental principles underlying the functioning of my invention;

Figure 3 illustrates, diagrammatically, the arrangement of the cores and windings of a single phase transformer in which my invention is incorporated;

Figure 4 is a view, in side elevation, of the arrangement of the cores and indicating member shown in Figure 3;

Figure 5 illustrates, diagrammatically, another embodiment of a single phase transformer with which my invention may be arranged for operation;

Figure 6 illustrates, diagrammatically, my invention as applied for indicating the presence of a fault in any one of the windings of a polyphase transformer;

Figure 7 is a view, in side elevation, of the core structure for the polyphase transformer illustrated in Figure 6;

Figure 8 is a view, in end elevation, of the core structure shown in Figure 7;

Figure 9 illustrates, diagrammatically, how my invention may be employed to provide a remote indication of the presence of a fault in one of the windings of a transformer; and Figure 10 is a view, in side elevation, of the core structure which may be employed for the transformer illustrated in Figure 9.

According to my invention I have provided for utilizing the change in the leakage field which is caused by the occurrence of a fault, for example, a short-circuited turn, in one of the windings of a transformer. Thus, if a short circuited turn occurs in one of the windings of a single phase transformer that is energized from a suitable source of alternating current, a shifting field will be generated because of the phase displaced currents flowing in the turns of the winding, including the short-circuited turn or turns. The current in the main part of the winding generates a flux in phase therewith. This flux generates a lagging current in the short circuited turn or turns. The lagging current in the short circuited turn or turns generates a flux in phase with the short circuit current but lagging behind the current and flux of the main part of the winding. These out of phase fluxes, when space displaced, will produce a shifting field. This shifting field is caused to induce eddy currents in a movable conductor, for example, a cylinder of copper or aluminum which, by its movement, indicates the presence of the shifting field and thereby the occurrence of the fault which causes its generation.

While it is theoretically correct to state that no rotation will be caused if the short circuited turn occurs at the exact center of the winding, this is of no practical significance. As a matter of fact, the short circuited turn or turns in a transformer ordinarily occur at the end of the winding that is connected to the line conductor. Therefore, as a practical matter, it may be stated that the rotating field will always be generated on the occurrence of one or more short circuited turns.

In a polyphase transformer adjacent windings normally generate a shifting or rotating magnetic field which is changed by the occurrence of a fault in one of the windings. In this instance the indicating cylinder may be provided with a spring or equivalent biasing member which will oppose the normal torque created by the normal shifting field of the adjacent windings. On the occurrence of a fault in one of the windings this torque is changed and a corresponding movement of the cylinder takes place, indicating the presence of a fault. In the polyphase construction the movement of the indicating device may indicate either a short-circuited turn or turns in one of the adjacent windings, or it may indicate the failure of energization as applied to one of the windings.

Ordinarily it is desirable to indicate, at a remote point, the presence of a fault in one of the windings of a transformer. It will be understood that the transformers are usually located at a point which is remote from the control room and that it is desirable to have an indication in the control room of the occurrence of a fault in one of the windings. For this purpose instrument windings are spaced apart on a magnetic core which links the windings of the transformer and are connected by suitable conductors to the operating windings which may be positioned on a magnetic core that is located at the remote point, for example, the control room. The indicating cylinder is mounted for rotation under the influence of the shifting field generated by the operating windings to indicate by its movement the presence of the fault as soon as it occurs.

Instead of indicating the presence of the fault in one of the windings and then requiring a manual operation to deenergize the transformer, a control circuit is provided which is effective to trip the circuit breaker controlling the connection of the transformer to the power source as soon as the fault occurs. If desired, indicating lights may be provided which will be energized on the occurrence of the fault.

With a view to more clearly setting forth the principles underlying the functioning of my invention, reference will first be had to the diagrammatic representation shown in Fig. 1 of the drawings. As there shown, a ring or core 15 of magnetic material, which is known to those skilled in the art as a Gramme ring, is provided, having windings 16, 17 and 18 spaced apart around it. The windings 16, 17 and 18 may be energized from a suitable source of polyphase alternating current, with the result that a rotating leakage field is set up within the core 15. Mounted for rotation about the axis of this rotating field is a movable member which may be in the form of a cylinder 19 that is formed of a conducting material such as aluminum or copper. When the windings 16, 17 and 18 are energized from a polyphase source of alternating current, eddy currents will be induced in the cylinder 19 which will generate magnetic fluxes that react with the magnetic fluxes generated by the windings on the core 15 in such manner as to cause the cylinder to rotate in one direction, for example, the direction indicated by the arrow 20. If the cylinder 19 is free to rotate, it will continue to do so as long as the windings 16, 17 and 18 are energized with polyphase alternating current. Suitable biasing means, such as a spring, may be provided for opposing the torque developed in the cylinder 19 for the purpose of holding it in a predetermined position when the windings 16, 17 and 18 are energized under normal operating conditions. If any appreciable change takes place in the rotating field which is generated by the three windings, it will be indicated by a movement of the cylinder 19 in one direction or the other, depending upon the character of the change.

In Figure 2 of the drawings it will be observed that the core 15 is provided with only one winding 16 which may be connected for energization to a suitable source of single phase alternating current. Instead of the additional windings 17 and 18, a winding 21 is provided which, as illustrated, is short-circuited upon itself. Short circuit current will flow through the turns of the winding 21 because of the transformer action between them and the turns of the winding 16. Since the magnetic flux generated by current flowing through the winding 16 will be approximately 90 electrical degrees behind the voltage which is applied thereto, while the flux generated by the winding 21 will be in phase with the current flowing therein and thus displaced in phase from the flux which is generated by the winding 16, a rotating field is still generated within the core 15 that tends to cause the cylinder 19 to rotate, for example, in the direction indicated by the arrow 22. Pole pieces 23 extending inwardly toward the cylinder 19 may be provided for increasing the effectiveness of the rotating magnetic field in generating eddy currents in the cylinder 19 for causing its rotation.

It will be understood that the rotating field will no longer be present if the winding 21 is not short circuited. However, it is unnecessary to use a separate winding 21 to cause the rotating field. One of the turns, or several of the turns, of the winding 16 may be short circuited to provide substantially the same effect that is provided when the independent winding 21 is employed and short circuited. Therefore, it will be apparent that the shifting or rotating magnetic field will be generated within the ring 15 whenever two or more magnetic fields are generated therein which are out of time and space phase with each other. Such a condition will exist if certain of the turns of the winding 16 are short circuited, as indicated at 24. It will be clear that the flux generated by the short circuit current flowing through these turns will be out of time phase with the flux generated by the current flowing through the remaining turns of the winding. Since the turns short circuited at 24 are spaced from the magnetic center of the remaining turns, the flux generated thereby will be out of space phase with the flux generated by the remaining turns of the winding 16. It will be understood that no rotation of the cylinder 19 will take place as long as the winding 16 remains in its normal operating condition and it is energized with alternating current from a single phase source. However, if a winding, such as the winding 21, is provided and short circuited, or if one or more of the turns of the winding 16 are short circuited, as indicated at 24, the shifting field will be generated, which will cause rotation of the cylinder 19. Thus, the movement of the cylinder 19 under these conditions indicates either the presence of a fault in the winding 16 or it indicates that turns in another winding, such as the winding 21, are short circuited.

Instead of positioning a cylinder 19 within the core 15, a cylinder 25 may be positioned outside of it, as illustrated. In this position it will rotate in the direction indicated by the arrow 26 if the shifting field generated within the ring 15 is in such direction as to cause the cylinder 19 to rotate in the direction indicated by the arrow 22. This follows from the fact that the rotating field generated in the core 15 may be considered as a rotating gear wheel which causes corresponding rotation of the cylinders 19 and 25, depending upon whether they are located within or without it.

Various concrete embodiments of my invention will now be described, which depend for their operation upon the principles set forth hereinbefore in connection with the description of the diagrammatic representations shown in Figures 1 and 2 of the drawings. These concrete embodiments are set forth by way of example only, since it will be apparent to those skilled in the art that many modifications of my invention may be made without departing from the spirit and scope thereof.

In Figure 3 of the drawings I have illustrated a transformer, shown generally at 27, of the single phase type having a magnetic core 28 with windings 29 and 30 positioned on a central leg thereof. It will be understood that either the winding 29 or the winding 30 may be connected for energization to a suitable source of single phase alternating current, while the other winding is connected to a suitable load, or merely is open-circuited. It will also be understood that, as is customary practice, the windings 29 and 30 are positioned either in substantially the same space relation or are displaced 180° in order to reduce losses to a minimum. In either case, the windings are substantially symmetrically spaced relative to each other. However, for illustrative purposes, they are shown as being unsymmetrically disposed, in order to simplify the disclosure. A magnetic core 31 is provided having one leg linking both of the windings 29 and 30. The core 31 corresponds generally to the core 15 shown in Figures 1 and 2 of the drawings and it is provided with inwardly extending pole pieces 32 which correspond to the pole pieces 23 shown in Figure 2. The core 31 is rectangular in form, rather than circular, since this form more readily lends itself to manufacture and assembly. A cylinder 33 of conducting material, such as aluminum or copper, is provided between the pole pieces 32 and it may be supported for rotation in any suitable manner, such as by the provision of the support wire 34. A core 35 of magnetic material is provided within the cylinder 33 and spaced therefrom to reduce the reluctance of the magnetic circuit between the pole pieces 32.

As long as one of the windings 29 or 30 is energized with single phase alternating current and none of the turns of either of the windings are short circuited, no movement of the cylinder 33 will take place, since the rotating field is not present, due to the fact that there is no space displacement between these windings. However, if any of the turns of the winding 30 should become short circuited, as indicated at 36, while the winding 29 is energized from the alternating current source, the rotating magnetic field will be generated within the core 31 having its center or axis of rotation substantially coaxial with the axis of rotation of the cylinder 33. As a result, the cylinder 33 will be rotated in one direction or the other to indicate that a fault has occurred in one of the windings. Suitable indicating means, as will be set forth hereinafter, may be provided for operation with the cylinder 35 to visually or otherwise indicate its movement, thereby giving an instantaneous indication of the occurrence of a fault in one of the windings 29 and 30. In like manner, if certain of the turns of the winding 29 are short circuited, as indicated at 37, then a corresponding rotation of the cylinder 33 will take place to indicate the presence of this fault.

It will now be apparent that I have provided a means for obtaining an indication of the occurrence of a fault in a winding, such as a transformer winding, which is energized with alternating current as soon as the breakdown, such as the occurrence of a short circuited turn, takes place. It is unnecessary to determine from an increased current flow that one or more of the turns of one of the windings have been short circuited, or to await the rise in temperature of the insulating medium, either solid or liquid, surrounding the faulty turns, to provide the necessary information. The presence of a short circuited turn or turns is immediately indicated by the movement of the cylinder 33 from its neutral position when no fault is present. This indication will be provided even though one of the windings is connected to a load, for the reason that the rotating field which is created by the combination of the flux in the energized winding and the flux generated by the short circuited turns, is not generated at any other time.

Another embodiment of my invention for application to a single phase transformer is illustrated in Figure 5 of the drawings. As there shown, a transformer, shown generally at 40, is provided, having a core 41 on the central leg of which windings 42 and 43 may be positioned. The core 41 is provided with arms 44 and 45, preferably unequal in length, and extending toward a common position with the outer ends spaced apart. A cylinder 46 formed of a suitable conducting material, such as aluminum or copper, is provided between the ends of the arms 44 and 45 for induction therein of eddy currents caused by the rotating magnetic field which may be generated on the occurrence of a fault in one of the windings 42 or 43. A core 47 of magnetic material may be positioned within the cylinder 46 to decrease the reluctance of the air gap between the ends of the arms 44 and 45. The arms 44 and 45 are preferably of unsymmetrical construction for the purpose of providing an indication of the occurrence of a fault under all operating conditions. I have discovered that the desired indication will not be provided if the arms 44 and 45 are symmetrical in construction when no load is carried by the winding of the transformer to which a load is normally connected.

The application of my invention for indicating the presence of a fault in any one of the windings of a polyphase transformer is illustrated in Figure 6 of the drawings. The polyphase transformer, shown generally at 50, is provided with a conventional magnetic core structure 51 having windings 52, 53 and 54, termed, for the purposes of description, primary windings, positioned on the intermediate legs thereof, the ends of which are connected in the customary manner to complete the magnetic circuit. Windings 55, 56 and 57, corresponding to the windings 52, 53 and 54, and termed secondary windings for purposes of description, are provided on the corresponding intermediate legs, as illustrated. The primary windings 52, 53 and 54 may be connected to a suitable source of polyphase current while the secondary windings 55, 56 and 57 may be connected to a suitable load. It will be understood that the windings 52 and 53 will normally generate in the magnetic circuit with which they are associated a rotating magnetic field having its axis of rotation between the intermediate legs on which these windings are mounted. In like manner, the primary windings 53 and 54 will generate a rotating field having its axis of rotation between the intermediate legs on which these windings are positioned. It will be understood that these magnetic fields will rotate in opposite directions.

In order to take advantage of these normally occurring rotating magnetic fields, cylinders 58 and 59, formed of suitable conducting material such as aluminum or copper, are provided, and are mounted for rotation coaxially with these magnetic fields. As set forth hereinbefore in connection with the description of Figure 1 of the drawings, these cylinders would continuously rotate, provided they were mounted for free rotation, as long as the primary windings 52, 53 and 54 continue to be energized from the polyphase source of alternating current.

It is desirable to restrain the cylinders 58 and 59 from normal rotation, and for this purpose cross members 60 and 61 are provided thereon having downwardly depending bearing members 62 and 63 for mounting on bearing pins 64 and 65 which are carried by cores 66 and 67 that are positioned between the pole pieces 68 and 69 for decreasing the reluctance of the air gaps therebetween. Spiral springs 70 and 71 are connected between the cylinders 58 and 59 and the cores 66 and 67 for opening the torque, tending to cause them to rotate in response to the rotating magnetic fields generated by the primary windings 52, 53 and 54. Since the cylinders 58 and 59 tend to rotate in opposite directions, the spiral springs 70 and 71 are oppositely disposed. Double spiral springs may be provided if it is desired to compensate for change in tension therein due to change in temperature.

Under normal operating conditions the cylinders 58 and 59 will assume positions corresponding to the normal torque which is applied thereto by the rotating fields generated by the primary windings 52, 53 and 54. In the event that one or more of the turns of any of the windings of the transformer 50 become short circuited, a change will take place in the torque which is applied to one or both of the cylinders 58 and 59, depending upon the particular location of the fault, and by its displacement from the normal position an indication will be given of the occurrence of the fault. Also, if one or more of the primary windings 52, 53 or 54 should be deenergized, a corresponding change will take place in the torque which is applied to the cylinders 58 and 59, thereby giving an indication that the transformer 50 is not functioning under normal operating conditions. As will be set forth hereinafter, suitable indicating devices or contact members may be operated by the movement of the cylinders 58 and 59 from the normal positions, to provide the desired indication or effect the desired control function, for example, the deenergization of the primary windings 52, 53 and 54 upon the occurrence of a short circuited turn in any of them or in any of the secondary windings 55, 56 or 57.

In many instances it is desirable to provide for indicating, at a point remote from a transformer, the occurrence of a fault in one of its windings. In power generating stations and in sub-stations the transformers are ordinarily located in a separate room or enclosure from the control room or are located out of doors. The operator should be provided with some means which will indicate to him in the control room that a fault has occurred in one of the windings of the transformers in the system. Alternatively, it is desirable to provide for automatically disconnecting the transformer on the occurrence of a fault therein. This will ordinarily necessitate the use of remotely controlled equipment.

For this purpose the construction illustrated in Figure 9 of the drawings is provided. As there shown, a single phase transformer, illustrated generally at 75, is provided, having a magnetic core 76 with windings 77 and 78 disposed on an intermediate leg thereof. A closed magnetic core 79 is provided having a portion linking both of the windings 77 and 78. Instrument windings 80, 81 and 82 are positioned in spaced relation around the closed magnetic core 79, as illustrated. On the occurrence of a fault, such as that caused by the short circuiting as at 83 of the turns of the winding 78, when the winding 77 is energized from a single phase source of alternating current, a rotating field will be generated in the closed magnetic core 79 which will induce corresponding currents in the spaced apart instrument windings 80, 81 and 82, as will be readily understood. The windings 80, 81 and 82 are connected to energize operating windings 84, 85 and 86, respectively, which may be located on a core 87, in the form of a Gramme ring, by means of conductors 88, 89 and 90. The rotating magnetic field in the closed magnetic core will be transferred in this manner through the core 87, which may be located at any desired position. A cylinder 91, formed of suitable conducting material such as aluminum or copper, is provided for rotation within the ring 87, preferably coaxially with the axis of rotation of the magnetic field generated by the operating windings 84, 85 and 86.

Under normal operating conditions, with no fault existing in either of the windings 77 and 78, the rotating magnetic field is not present in the closed magnetic core 79 and therefore no corresponding rotating magnetic field exists in the core 87. The cylinder 91 then remains in its normal position. On the occurrence of a fault in either of the windings 77 or 78, as indicated at 83, the rotating field will be generated in the core 79 and a corresponding rotating field will be generated in the core 87. As a result, the cylinder 91 will be rotated from its normal position to indicate that a fault exists in one of the windings 77 or 78 of the transformer 75. A suitable pointer may be provided for movement with the cylinder 91 or contact members may be arranged to be closed or opened by its movement to provide any desired control function to take place as the result of occurrence of the fault.

Of course, it is desirable to provide some visual indication of the occurrence of one or more short circuited turns. It is also desirable in many instances to provide for immediately deenergizing the winding upon the occurrence of a short circuited turn or turns in order to limit to a minimum the damage resulting therefrom. For this purpose any of the members, such as the cylinders 33, 46 of Figures 3 and 5, respectively, or the cylinders 58 and 59 of Figure 6, or the cylinder 91 of Figure 9, may be provided with either a suitable pointer and cooperating scale or with contact members arranged to cooperate with other contact members for the purpose of energizing various circuits to light indicating lamps or energize the trip winding of a circuit breaker. Since the provision of these various expedients and the manner in which they may be applied will be readily apparent to those skilled in the art, a further description thereof is not set forth herein other than as illustrated in Figure 9 and described hereinafter.

As shown in Figure 9 of the drawings, the cylinder 91 may be provided with an arm 94 which may be biased to a zero position by a spiral spring 95. The arm 94 carries a pointer 96 which is arranged to cooperate with a scale 97.

The arm 94 may also be provided with contact members 98 and 99 which are arranged to be moved into contact engagement with stationary contact members 100 and 101, respectively. As previously indicated, the contact members may be employed to complete various circuits for operating signaling circuits or control circuits as the case may be. Obviously, normally closed contact members can be provided for cooperating with the movement of the arm 94 instead of normally open contact members as shown.

Since certain further changes may be made in the above constructions and different embodiments of the invention may be made without departing from the scope thereof, it is intended that all matter contained in the above description or shown in the accompanying drawings shall be interpreted as illustrative, and not in a limiting sense.

I claim as my invention:

1. In combination; a winding, energized with alternating current accompanied by a normal flux, subject to undesirable short circuit which causes a shifting of at least part of the normal flux due to space and phase displaced short circuit currents; and short circuit responsive means actuated by the resultant shifting flux.

2. In combination; a winding, energized with alternating current accompanied by a normal flux, subject to undesirable short circuit accompanied by an abnormal flux displaced in space and time from the normal flux; and means responsive to the combined action of the normal and abnormal fluxes.

3. In combination; a winding, energized with alternating current accompanied by a normal flux, subject to undesirable short circuit accompanied by an abnormal flux displaced in space and time from the normal flux; magnetic circuit means linking said winding for induction therein of the normal and abnormal fluxes; and means responsive to the fluxes in said magnetic circuit means.

4. In combination; a winding energized with alternating current accompanied by a normal flux, subject to undesirable short circuit accompanied by an abnormal flux displaced in space and time from the normal flux; a closed magnetic core linking said winding for induction therein of the phase displaced fluxes; pole pieces forming a part of and extending inwardly of said magnetic core; and a conductor movably mounted between said pole pieces and actuated by the fluxes in said magnetic core.

5. In combination; a winding energized with alternating current accompanied by a normal flux, subject to undesirable short circuit accompanied by an abnormal flux displaced in space and time from the normal flux; a closed magnetic core linking said winding for induction therein of the phase displaced fluxes; a pair of arms of magnetic material forming a part of and extending from said magnetic core toward a mutually intersecting position with the adjacent ends spaced apart; and means mounted for movement between the spaced apart ends of said arms and responsive to the fluxes in said magnetic core.

6. In combination; a winding energized with alternating current accompanied by a normal flux, subject to undesirable short circuit accompanied by an abnormal flux displaced in space and time from the normal flux; a closed magnetic core linking said winding for induction therein of the phase displaced fluxes; a pair of unsymmetrical arms of magnetic material forming a part of and extending from said magnetic core toward a mutually intersecting position with the adjacent ends spaced apart; and a cylindrical member of conducting material rotatably mounted between the spaced apart ends of said arms and actuated by the fluxes in said magnetic core.

7. In combination; a plurality of windings disposed on individual interconnected magnetic cores, energized with polyphase alternating current accompanied by normal rotating fluxes, and subject to undesirable short circuits accompanied by abnormal fluxes displaced in space and time from the normal fluxes; and means responsive to the combined action of the normal and abnormal fluxes.

8. In combination; a plurality of windings disposed on individual interconnected magnetic cores, energized with polyphase alternating current accompanied by normal rotating fluxes, and subject to undesirable short circuits accompanied by abnormal fluxes displaced in space and time from the normal fluxes; a conductor mounted for rotation about each of the axes of the rotating fluxes in adjacent cores, and means biasing each conductor against the action of the rotating flux individual thereto and permitting movement thereof under the combined action of the normal and abnormal fluxes.

9. In combination; a winding, energized with alternating current accompanied by a normal flux, subject to undesirable short circuit accompanied by an abnormal flux displaced in space and time from the normal flux; polyphase coil means in the fluxes; phase difference responsive means at a remote point; and circuit means interconnecting said polyphase coil means and said remotely disposed phase difference responsive means.

10. In combination; a winding, energized with alternating current accompanied by a normal flux, subject to undesirable short circuit accompanied by an abnormal flux displaced in space and time from the normal flux; a magnetic core linking said winding for induction therein of the phase displaced fluxes; a polyphase winding on said magnetic core connected to another polyphase winding at a remote point; and means responsive to shifting flux generated by said other polyphase winding.

11. In combination; a winding, energized with alternating current accompanied by a normal flux, subject to undesirable short circuit accompanied by an abnormal flux displaced in space and time from the normal flux; a magnetic core linking said winding for induction therein of the phase displaced fluxes; a polyphase winding on said magnetic core connected to another polyphase winding at a remote point; a magnetic core at said remote point linking said other polyphase winding; and a conductor member movably mounted within the influence of the shifting magnetic field generated by said other polyphase winding.

12. In combination; a winding, energized with alternating current accompanied by a normal flux, subject to undesirable short circuit accompanied by an abnormal flux displaced in space and time from the normal flux; a closed magnetic core linking said winding for induction therein of the phase displaced fluxes; a plurality of instrument windings spaced apart on said closed magnetic core; a closed magnetic core remotely located from the first mentioned magnetic core, a plurality of spaced apart operating windings linking the remotely located magnetic core and connected for individual energization to said instrument windings; and a conductor member movably mounted within the influence of the shifting magnetic field generated by said operating windings.

13. In combination, a transformer having primary and secondary windings, energized from an alternating current source accompanied by normal fluxes, subject to undesirable short circuits accompanied by abnormal fluxes displaced in space and time from the normal fluxes; and means responsive to the combined action of the normal and abnormal fluxes.

14. In combination, a transformer having symmetrically disposed primary and secondary windings, energized from an alternating current source accompanied by normal fluxes, subject to undesirable short circuits accompanied by abnormal fluxes displaced in space and time from the normal fluxes; polyphase coil means in the fluxes; phase difference responsive means at a remote point; and circuit means interconnecting said polyphase coil means and said remotely disposed phase difference responsive means.

15. In combination, a transformer having symmetrically disposed primary and secondary windings, energized from an alternating current source accompanied by normal fluxes, subject to undesirable short circuits accompanied by abnormal fluxes displaced in space and time from the normal fluxes; a magnetic core linking said primary and secondary windings for induction therein of the phase displaced fluxes, a polyphase winding on said magnetic core connected to another polyphase winding at a remote point; and means responsive to shifting flux generated by said other polyphase winding.

EDMUND O. SCHWEITZER, Jr.